(Model.)
A. C. RHODES.
SHOW BOX COVER.
No. 278,743. Patented June 5, 1883.
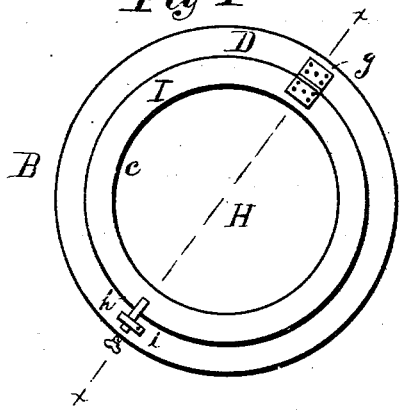
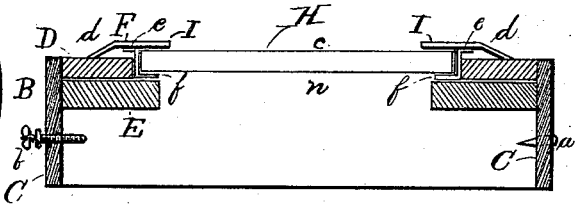
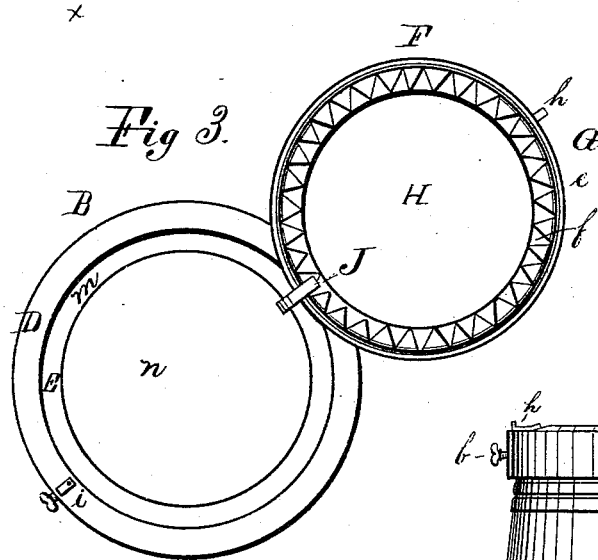
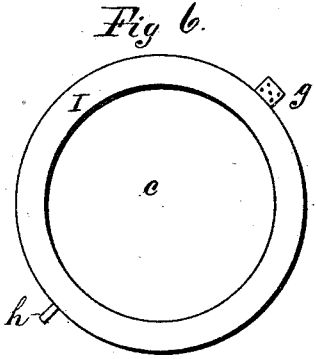
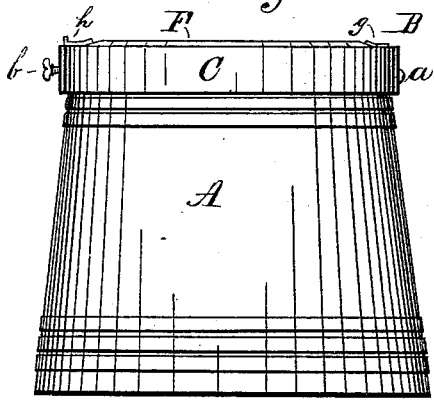
Witnesses.
C. O. Swett.
Sherwood Welch.
Inventor.
Alexander C. Rhodes.
By J. S. Duffie
his Attorney

UNITED STATES PATENT OFFICE.

ALEXANDER C. RHODES, OF LITTLE ROCK, ARKANSAS.

SHOW-BOX COVER.

SPECIFICATION forming part of Letters Patent No. 278,743, dated June 5, 1883.

Application filed March 6, 1883. (Model.)

*To all whom it may concern:*

Be it known that I, ALEXANDER C. RHODES, a citizen of the United States, residing at Little Rock, in the county of Pulaski and State of Arkansas, have invented certain new and useful Improvements in Show-Box or Cask Covers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to show-box or cask covers, barrels, kits, firkins, and other vessels used to hold fruits, butter, cheese, lard, &c., and is so constructed as to protect the same from dust and from being handled, while at the same time displaying the contents to view.

The invention consists in the novel construction and arrangement of its parts. It may be made round or square and of any suitable size, and is described as follows:

Figure 1 represents a top plan view of the same with the lid closed. Fig. 2 represents a vertical sectional view of Fig. 1, enlarged, on the line X X, with hinge *g* and handle *h* left off. Fig. 3 represents a top plan view with the lid thrown open, and Fig. 4 is a view of hoop G. Fig. 5 represents the cover B, secured on a firkin of butter by means of pin *a* and thumb-screw *b*. Fig. 6 represents a bottom face view of the perforated sheet-metal disk, which, in conjunction with hoop G, Fig. 4, and glass H, Fig. 2, forms the lid F.

To make the same I take the cover B of any vessel and cut in the top thereof an opening, *m*, leaving a rim, D. Then I insert the head E, having a smaller opening, *n*, on the inside of the rim, with the grain of the wood running across the grain of the rim D. This leaves a projection of the head E in the opening *m* of rim D all the way round for the lid F to rest on when closed. To make the lid F, I take a piece of tin or other sheet-metal disk, I, and cut it large enough for its outer edge to extend over the inner edge of rim D of the cover B. I cut an opening, *c*, in the disk, as shown in Figs. 1 and 6. The outer edge of this disk I turn down, as shown at *d*, Fig. 2, so that when closed it will fit close down on the top of the cover B and prevent dust from getting into the cask or box A. This turned-down portion stiffens and strengthens the cover F. Then I make a hoop, G, of tin or other sheet metal, and turn a flange, *e*, on one edge and cut teeth *f* on the other. This hoop is then soldered on the under side of disk I, so that the outer edge of the flange *e* does not extend to the outer edge of the disk I, leaving a projection of the inner edge of the disk for holding in the glass. I cut my glass H to fit into the hoop G, and after soldering the hoop to the disk I insert the glass, and then turn the teeth *f* down on it, and it is securely held in the lid F. I then secure my lid on the cover B by means of one or more hinges, *g*, and provide the lid with a handle, *h*, and the cover with a thumb-button, *i*, to be turned over the handle or other suitable fastening to hold the lid closed. The hoop C of the cover B is secured on the outer edge of the rim D and head E, and in one side of this hoop I insert a pin, *a*, passing through the same from the outer to the in side, the sharp point being inward; and on the other side, and just opposite pin *a*, I insert a thumb-screw, *b*. To secure this cover on the cask, box, or other vessel, I put the cover on the top of the cask, with the pin *a* opposite me. Then I give the cover a little pull. This drives the pin in the wood sufficiently far to hold. Then I turn the thumb-screw *b* until the point thereof is driven into the wood of the box or cask and my cover B is secured on the top of the same, and the lid F may be thrown open without interfering with the cover B.

On the under side of head E, I may secure one end of a spring, J, Fig. 3, and the other end to the under side of the lid F. This spring should be so bent that when unsprung it holds the lid back at a little more than an angle of ninety degrees in relation to the top of the cover, and is stiff enough to keep the lid from coming down with a slam and breaking the glass. I do not consider this spring essential, and may not use it on light covers.

Having thus described my invention, what I claim as new and useful, and desire to protect by Letters Patent, is—

The combination, with a show-box cover, B, having a hoop, C, and rim D, with opening *m*, and head E, with opening $n$, of the lid F, consisting of the disk I, with its outer edge, $d$, turned down, and hoop G, having flange $e$ and teeth $f$ soldered to the under side of the disk, and glass H, secured between the disk and hoop by the teeth, all substantially as shown and described.

In testimony whereof I affix my signature in presence of two witnesses.

ALEX. C. RHODES.

Witnesses:
 THOMAS A. BARRELLE,
 J. J. WIGGS.